United States Patent
Kim et al.

[11] Patent Number: 6,004,615
[45] Date of Patent: Dec. 21, 1999

[54] PROCESS FOR PREPARING FLAVOR COMPOSITION

[75] Inventors: Hyung Wook Kim, Irvington, N.Y.; Dharam Vir Vadehra, New Milford; Elaine Regina Wedral, Sherman, both of Conn.

[73] Assignee: Nestec S.A., Vevey, Switzerland

[21] Appl. No.: 08/954,023

[22] Filed: Oct. 20, 1997

[51] Int. Cl.$^6$ .................................................... A23L 1/221
[52] U.S. Cl. ............................ 426/650; 426/98; 426/99; 426/533
[58] Field of Search ................................ 426/99, 98, 653, 426/650, 533, 96, 518

[56] References Cited

U.S. PATENT DOCUMENTS

| | | | |
|---|---|---|---|
| 3,867,556 | 2/1975 | Darragh et al. ........................... | 426/98 |
| 4,163,066 | 7/1979 | Mason et al. ............................. | 426/99 |
| 4,871,558 | 10/1989 | Tackikawa et al. ..................... | 426/99 |
| 5,064,669 | 11/1991 | Tan et al. ................................. | 426/99 |
| 5,204,029 | 4/1993 | Morgan et al. .......................... | 426/99 |

*Primary Examiner*—Lien Tran
*Attorney, Agent, or Firm*—Pennie & Edmonds LLP

[57] ABSTRACT

A process for the preparation of a substantially free flowing particulate flavor by mixing an oil soluble flavor with a melted edible fat having a melting point from about 30° C. (85° F.) to 93° C. (200° F.) to form a solution of the oil soluble flavor in the melted fat, cooling the solution of the oil soluble flavor in the melted fat, with the addition of a super-cooling agent with agitation during cooling, to produce solid particles having an average diameter of from about 0.1 to 10 cm, and then, if desired, grinding these particles with a super-cooling agent to produce the substantially free flowing particulate flavor whose particles have an average diameter of less than 1 mm.

9 Claims, No Drawings

PROCESS FOR PREPARING FLAVOR COMPOSITION

FIELD OF THE INVENTION

The present invention relates to a process for preparing a particulate flavor material and more especially to a particulate flavor material comprising a flavor encapsulated or entrapped by a fat.

BACKGROUND OF THE INVENTION

Particulate flavor materials comprising a flavor encapsulated or entrapped by a fat are often prepared commercially by spray-chilling a liquid mixture of flavor and fat to provide discrete particles. However, the spray-chill process requires an expensive spray drier and, in this process, the feed mixture of melted fat and oil soluble flavor at a temperature above the melting point is passed through the spray drier in the normal manner but without any heating, whereby the droplets from the atomizer solidify immediately as they hit the cold air to provide a free flowing powder. One of the difficult problems with the spray-chill process is that the entire feed line has to be heated properly without any cold areas, because the product easily solidifies in the line in such areas and, if this happens, it is very difficult to unblock the line. We have developed a process without using a spray drier thus avoiding the above problem and, in addition, the product may have better flow characteristics and better appearance than a product prepared using the spray-chill method.

SUMMARY OF THE INVENTION

According to the present invention, there is provided a process for the preparation of a substantially free flowing particulate flavor which comprises mixing an oil soluble flavor with a melted edible fat having a melting point from about 30° C. (85° F.) to 93° C. (200° F.) in a reaction vessel to form a solution of the oil soluble flavor in the melted fat, cooling the solution of the oil soluble flavor in the melted fat, adding a super-cooling agent with agitation during cooling to the solution of the oil soluble flavor in the melted fat to produce solid particles having an average diameter of from about 0.1 to 10 cm, and then grinding these particles with a supercooling agent to produce the substantially free flowing particulate flavor whose particles have an average diameter of less than 1 mm.

DETAILED DESCRIPTION OF THE INVENTION

In the process of the present invention, the fat is preferably melted before the oil soluble flavor is added. The fat may be any edible fat and may be, for instance, a hydrogenated or partially hydrogenated vegetable oil, a wax or stearine. Preferably, the fat has a melting point of from about 40° C. (104° F.) to 70° C. (158° F.) and more preferably from 55° C. (130° F.) to 65° C. (155° F.). The melted fat may be heated to a temperature from about 2° C. to 5° C. (5° F. to 100° F.) above its melting point but preferably the fat is heated to a temperature of from 5° C. to 20° C. (10° F. to 40° F.) above its melting point.

Any oil soluble flavor may be used in the process, for example, chicken flavor, cheese flavor, fish flavor, tomato flavor, vegetable flavor, meat flavor, popcorn flavor, or a dairy flavor such as butter flavor. The flavors may be partially or fully soluble in oil. The amount of oil soluble flavor to be mixed with the fat may be from about 0.1 to 50%, preferably from 5 to 40%, and more preferably from 20 to 30% by weight based on the total weight of the mixture.

Cooling of the oil soluble flavor in the melted fat may start by means of cold water or cooling liquid circulating the reaction vessel.

The amount of super-cooling agent added to the solution of the oil soluble flavor in the melted fat may be from about 1 to 500%, more usually from 25 to 75% and preferably from 40 to 60% by weight based on the weight of the solution.

The super-cooling agent may be particulate dry ice (i.e., solid carbon dioxide), liquid carbon dioxide or liquid nitrogen. The super-cooling agent should be added before the solution of the oil soluble flavor in the melted fat solidifies. The solution of the oil soluble flavor in the melted fat together with the super-cooling agent may be cooled to a temperature as low as 0° C. (32° F.) but more usually from about 10° C. (50° F.) to 30° C. (86° F.) depending on the fat used. Solid particles having an average diameter of from about 0.1 to 10 cm (mostly "rice" or "bean" sized) are formed by addition of the super-cooling agent. These particles may be stored at freezing temperatures until such time as the free-flowing particulate flavor is needed whereupon they may be ground, thus minimizing flavor loss.

The present invention also provides a process for preparing solid particles having an average diameter of from about 0.1 to 10 cm for production of a substantially free flowing particulate flavor which comprises mixing an oil soluble flavor with a melted edible fat having a melting point from about 30° C. (85° F.) to 93° C. (200° F.) in a reaction vessel to form a solution of the oil soluble flavor in the melted fat, cooling the solution of the oil soluble flavor in the melted fat, adding a super-cooling agent with agitation during cooling to the solution of the oil soluble flavor in the melted fat to produce the solid particles having an average diameter of from about 0.1 to 10 cm.

The super-cooling agent is added to assist in the grinding of the solid particles. Advantageously, particulate dry ice (solid carbon dioxide), liquid carbon dioxide or liquid nitrogen can be used. The amount of super-cooling agent added for grinding the solid particles may be from about 1 to 500%, more usually from 25 to 75% and preferably from 40 to 60% by weight based on the weight of the solid particles.

The grinding may be carried out simply in a blender or grinder. A cryogenic grinder may also be used. Without the addition of the super-cooling agent, it is not possible to properly grind the particles due to the stickiness of the product. With the addition of the super-cooling agent, however, the temperature falls sufficiently to cause the product to become brittle and easy to grind. The particles may have an average diameter between about 30 microns and 1 mm.

The free-flowing particulate flavor may be added to foodstuffs, e.g. frozen dishes, soups, salad dressings, in any desired proportions, and typically from about 0.01 to 10.0% by weight depending on the foodstuff.

EXAMPLES

The following Example further illustrates the present invention. Parts are given by weight.

Example I 10 parts of stearine (Melting Point of 58–62° C. (136–144° F.)) are charged in a heating kettle and heated to 76° C. (170° F.). 2.9 parts of POU-41 oil soluble chicken flavor are added and mixed well to form a solution of the flavor in the stearine. The mixture is then cooled by cold water circulating through the jacket of the heating kettle and during the cooling, 6.3 parts of dry ice powder is added over a period of 15 minutes with agitation. The dry ice solidifies the spot where it contacts the surface immediately, producing "rice" or "bean" size solid particles of flavor encapsulated or entrapped with the stearine having an average diameter of from 0.1 to 10 cm. The temperature dropped to 40° C. (104° F.).

The solidified product is scooped out of the kettle and 2.8 parts of the solidified product together with 3 parts of dry ice powder is fed to a "Reeves" grinder with a 0.032 inch screen (0.8 mm)—U.S. Standard Sieve No. 20. After grinding, 2.5 parts of free-flowing flavor is recovered. 0.3 parts of this flavor is added to Lean Cuisine, Frozen, Glazed Chicken Dish produced by Stouffer. The chicken dish is placed in a microwave oven and cooked whereupon there is a good chicken aroma release.

The remaining 10 parts of the ungrounded product is stored in a freezer until needed. It then can be ground at a later time thus minimizing flavor loss.

What is claimed is:

1. A process for the preparation of a substantially free flowing particulate flavor which comprises mixing an oil soluble flavor with a melted edible fat having a melting point from about 30° C. (85° F.) to 93° C. (200° F.) in a reaction vessel to form a solution of the oil soluble flavor in the melted fat, cooling the solution of the oil soluble flavor in the melted fat, adding a first amount of a super-cooling agent selected from the group consisting of particulate dry ice (solid carbon dioxide), liquid carbon dioxide and liquid nitrogen with agitation during cooling, to produce solid particles having an average diameter of from about 0.1 to 10 cm, removing the solid particles from the reaction vessel, providing a super-cooling agent and adding the second amount of the super-cooling agent to the solid particles, and then grinding these particles together with the second amount of the super-cooling agent to produce a substantially free flowing particulate flavor whose particles have an average diameter of less than 1 mm.

2. A process according to claim 1 wherein said first amount of super-cooling agent is added to the solution of the oil soluble flavor in the melted fat in an amount from about 1 to 500% by weight based on the weight of the solution.

3. A process according to claim 1 wherein the fat is a hydrogenated vegetable oil, a partially hydrogenated vegetable oil, a wax or stearine.

4. A process according to claim 1 wherein the fat is heated to a temperature of from about 2° C. to 50° C. (5° F. to 100° F.) above its melting point.

5. A process according to claim 1 wherein the oil soluble flavor is chicken flavor, cheese flavor, fish flavor, tomato flavor, vegetable flavor, meat flavor, popcorn flavor, or a dairy flavor.

6. A process according to claim 1 wherein the amount of oil soluble flavor mixed with the fat is from 0.1 to 50% by weight based on the total weight of the mixture.

7. A process according to claim 1 wherein the second amount of super-cooling agent added during the grinding step is in an amount sufficient to reduce the temperature to avoid sticking of the particles.

8. A process for the preparation of a substantially free flowing particulate flavor without the use of a spray chilling apparatus, which comprises mixing an oil soluble flavor with a melted edible fat having a melting point from about 30° C. (85° F.) to 93° C. (200° F.) in a reaction vessel to form a solution of the oil soluble flavor in the melted fat, cooling the solution of the oil soluble flavor in the melted fat without the use of a spray chilling apparatus adding a first amount of a super-cooling agent selected from the group consisting of particulate dry ice (solid carbon dioxide), liquid carbon dioxide and liquid nitrogen with agitation during cooling to produce solid particles having an average diameter of from about 0.1 to 10 cm, removing the solid particles from the reaction vessel providing a second amount of said super-cooling agent and adding the second amount of the super-cooling agent to the solid particles, and then grinding these particles together with the second amount of the super-cooling agent to produce a substantially free flowing particulate flavor whose particles have an average diameter of less than 1 mm.

9. A process according to claim 8 wherein the oil soluble flavor is chicken flavor, cheese flavor, fish flavor, tomato flavor, vegetable flavor, meat flavor, popcorn flavor, or a dairy flavor.

* * * * *

UNITED STATES PATENT AND TRADEMARK OFFICE
CERTIFICATE OF CORRECTION

PATENT NO. : 6,004,615
DATED : December 21, 1999
INVENTOR(S) : Hyung Wook Kim et al.

Page 1 of 1

It is certified that error appears in the above-identified patent and that said Letters Patent is hereby corrected as shown below:

<u>Title page,</u>
Item [22], Filed change "Oct. 20, 1997" to -- Oct. 17, 1997 --.

<u>Column 3,</u>
Line 25, after "providing a" insert -- second amount of said --.

<u>Column 4,</u>
Line 27, after "apparatus" insert -- , --.

Signed and Sealed this

Ninth Day of July, 2002

*Attest:*

JAMES E. ROGAN
*Attesting Officer*     *Director of the United States Patent and Trademark Office*